(12) United States Patent
Gunderson et al.

(10) Patent No.: US 11,953,411 B2
(45) Date of Patent: *Apr. 9, 2024

(54) METHOD AND SYSTEM FOR LYSING A LIQUID SAMPLE WITH AUGMENTED OXIDIZING AGENTS TO CREATE A SOLUTION WITH A REDUCED MICROBIAL CONCENTRATION AND PRECIPITATE FORMATION

(71) Applicant: BIS SCIENCE LLC, Fort Worth, TX (US)

(72) Inventors: Marc W. Gunderson, Fort Worth, TX (US); Paul Dabney, Georgetown, TX (US)

(73) Assignee: BIS SCIENCE LLC, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,378

(22) Filed: Jan. 30, 2023

(65) Prior Publication Data

US 2023/0184640 A1   Jun. 15, 2023

Related U.S. Application Data

(63) Continuation of application No. 17/889,705, filed on Aug. 17, 2022, now Pat. No. 11,598,701.

(60) Provisional application No. 63/233,902, filed on Aug. 17, 2021.

(51) Int. Cl.
*G01N 1/34* (2006.01)
*G01N 1/40* (2006.01)

(52) U.S. Cl.
CPC ............. *G01N 1/34* (2013.01); *G01N 1/4044* (2013.01)

(58) Field of Classification Search
CPC .. C02F 1/004; C02F 1/30; C02F 1/302; C02F 1/305; C02F 1/307; C02F 1/32; C02F 1/38; C02F 1/52; C02F 1/72; C02F 1/722; C02F 1/725; C02F 2101/306; C02F 2101/34; C02F 2101/38; C02F 2103/001; C02F 2103/002; C02F 2103/005; C02F 2103/023; C02F 2103/10; C02F 2103/22; C02F 2103/327; C02F 2103/365; C02F 2305/023; C02F 2305/026; C02F 2305/10; G01N 1/34; G01N 1/4044

See application file for complete search history.

(56) References Cited

U.S. PATENT DOCUMENTS

| | | | |
|---|---|---|---|
| 6,096,219 A * | 8/2000 | Green | B01J 19/087 422/186.01 |
| 7,422,680 B2 | 9/2008 | Sheets, Sr. | |
| 10,906,829 B1 | 2/2021 | Dabney | |
| 11,033,648 B2 | 6/2021 | Dabney | |
| 2012/0039796 A1 * | 2/2012 | Markou | A61P 35/00 424/125 |
| 2013/0023448 A1 * | 1/2013 | Glasscott | C02F 1/302 166/305.1 |

OTHER PUBLICATIONS

International Search Report and Written Opinion dated Oct. 25, 2022, in connection with corresponding International Patent Application No. PCT/US2022/040598; 7 pages.

* cited by examiner

*Primary Examiner* — Jennifer Wecker
(74) *Attorney, Agent, or Firm* — Maier & Maier, PLLC

(57) ABSTRACT

A method for differentially lysing a liquid sample or target material using an augmented oxidizing agent (AOA), which includes a quantity of electronically modified oxygen derivatives (EMODs). The method reduces or eliminates total dissolved solids (IDS), total suspended solids (TSS), Biologic Oxygen Demand (BOD), microbial concentration, biofilms and other content in the liquid target material known or suspected to contain animal fluids, blood and blood cells and suspected or known to contain eukaryotic cells, microbial cells, bacteria, viruses, spores, fungi, prions, organic matter, minerals, proteins or associated structures. The BOD, TDS and TSS can be lowered or eliminated as desired. This action is directly proportional to the quantity of EMODs in the AOS applied to the liquid target material.

18 Claims, No Drawings

METHOD AND SYSTEM FOR LYSING A LIQUID SAMPLE WITH AUGMENTED OXIDIZING AGENTS TO CREATE A SOLUTION WITH A REDUCED MICROBIAL CONCENTRATION AND PRECIPITATE FORMATION

BACKGROUND

Wastewater, dairy products, blood plasma and blood cells contain a dramatic amount of proteins, fats, minerals, elements and small molecular weight constituents that once separated allow for hygienic disposal or repurposing of the resultant separated matter in environmentally sound methods. This is one of the major reasons why, for example, blood plasma (often simply referred to as plasma, i.e. an anticoagulated whole blood sample; deprived of cells and erythrocytes) and blood serum (often simply referred to as serum, i.e. coagulated whole blood; deprived of cells, erythrocytes and most proteins of the coagulation system, especially of fibrin/fibrinogen), respectively, are not used for their water value or disposed as waste. Animal Fluids, blood, blood cells, microbes, wastewater and organic matter tend to be even more difficult to dispose of as compared to serum or plasma. Blood, for example, tends to be less stable and contain total dissolved solids (TDS), total suspended solids (TSS), biochemical oxygen demand (BOD), and other components that complicate its disposal unless it is lysed and the components separated. Organic matter pertains to any carbon-based compound that exists in nature. Living things are described as organic since they are composed of organic compounds. Examples of organic compounds are carbohydrates, lipids, proteins and nucleic acids. Since they are comprised of carbon-based compounds, they are broken down into smaller, simpler compounds through decomposition and through lysing. Living organisms also excrete or secrete material that is considered an organic material. Biochemical oxygen demand (BOD) is the amount of dissolved oxygen (DO) needed by aerobic biological organisms to break down organic material present in a given water sample at certain temperature over a specific time period. The BOD value is most commonly expressed in milligrams of oxygen consumed per liter of sample during 5 days of incubation at 20° C. and is often used as a surrogate of the degree of organic pollution of water.

BOD reduction is used as a gauge of the effectiveness of wastewater treatment plants. BOD of wastewater effluents is used to indicate the short-term impact on the oxygen levels of the receiving water.

BOD analysis is similar in function to chemical oxygen demand (COD) analysis, in that both measure the amount of organic compounds in water. However, COD analysis is less specific, since it measures everything that can be chemically oxidized, rather than just levels of biologically oxidized organic matter.

The organic matter from wastewater, dairy products and blood may contain useful substances that contribute a value when separated from the liquid. This organic matter contains substances that can be repurposed as food sources, as fertilizer, as medicines or and other uses.

At present it appears that appropriate separation/handling of wastewater, animal fluids, blood, blood cells, microbes and organic matter, e.g. by centrifugation, filtration, heating, cooling, precipitation or analyte extraction is essential, before such processed sample can be properly and reliably disposed of or repurposed.

As indicated above, serum or plasma may be obtained from whole blood and repurposed or disposed of as needed. Cells, cell constituents, microbes, organic matter and erythrocytes may also be removed by filtration or centrifugation from wastewater, blood or blood components or from other animal fluids but a lower cost method is desired over present commercially available techniques.

In a further way of sample processing, the wastewater, animal fluids, blood, blood cells, microbes and other organic matter of interest can first separated from the majority of substances by selective precipitation or extraction methods. Extraction can be performed in liquid phase or on a solid phase. Gross extraction of larger particles can be sequenced with extraction methods getting progressively smaller sized precipitate molecules until the desired resolution is obtained.

Debris and precipitated proteins usually are removed from a sample by centrifugation, filtration or solid phase extraction.

Solid phase extraction (SPE) is a technique which is used for pre-concentration and cleanup of wastewater, animal fluids and blood samples, for purification of various samples, and for removal of valuable substances from aqueous solutions of wastewater, animal fluids, blood microbes, and organic matter.

Erythrocytes comprised in a whole blood sample may be lysed and the hemoglobin is released. The known state of the art neither disclose nor suggest that a hemolysed blood sample currently can be economically prepared so that the BOD, TDS, TSS and other constituents can be separated for commercial use It becomes obvious from the above discussion of the state of the art that no method for a thorough, lysing, precipitation, decontamination and separation of wastewater, dairy, slaughter house and blood components exists or is available on a commercial scale that is also economically feasible. It would, however, be highly desirable if wastewater, animal fluids, blood, blood cells, microbes and organic matter could be separated into useful components. This would be especially advantageous where wastewater, animal fluids, blood and other liquids could be repurposed in areas where liquids are needed for animal consumption or agricultural uses.

SUMMARY

The embodiments relate to a method for differentially lysing wastewater, animal fluids, blood, blood cells, microbes, and organic matter using an Augmented Oxidizing Agent (AOA), which includes an effective amount of Electronically Modified Oxygen Derivatives (EMODs). The embodiments also provide for reducing or eliminating BOD, total dissolved solids (TDS), total suspended solids (TSS), microbial concentration, biofilms and other content in a liquid sample or target material, which is known or suspected to contain wastewater, animal fluids, blood and blood cells and suspected or known to contain eukaryotic cells, microbial cells, organic matter, minerals, proteins or associated structures. BOD, TDS and TSS can be lowered or eliminated as desired. This action is directly proportional to the amount of AOA EMODs applied to the blood.

The method including the steps of processing the sample or target material with a membrane solubilizing agent under conditions appropriate to lyse cell membranes of animal fluids, blood, blood cells, microbial cells or associated structures and at the same time not to cause or to cause precipitation of sample constituents, based on the desired outcome. In some instances, the precipitation of the microbial components, organic components, and blood constituents will be undesired because the wastewater, blood other liquid and their components will be discarded. As an example, blood or other liquids containing organic matter such as dairy products or wastewater with a TDS, TSS, and/or BOD content low enough can be released into public sewer systems. At other times, the precipitation of wastewater, organic matter, or blood components will be desired because these components are marketable as animal feed, plant fertilizer and other commodities. The lysis of wastewater components, organic components, blood, blood cells, microbial cells and associated structures is an advantage in a method of separating liquids and non-liquids. The solubilization of organic matter including blood cells can be easily combined with techniques to separate wastewater, microbes, blood and/or organic components as needed for various applications.

DETAILED DESCRIPTION OF THE EMBODIMENTS

Aspects of the present invention are disclosed in the following detailed description. Those skilled in the art will recognize that alternative exemplary embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Unless defined otherwise, all technical and scientific terms used herein have the meaning commonly understood by a person skilled in the art to which this disclosure belongs. The following terms may have meanings ascribed to them below, unless specified expressly otherwise. However, it should be understood that other meanings that are known or understood by those having ordinary skills in the art are also possible, and within the scope of the present disclosure.

As used herein, "organic matter" pertains to any carbon-based compound that exists in nature, non-living or living. Organic matter may consist of animal carcasses, bones, tendons, features, skin, organs, beaks, feet, hooves, snouts, or any part of animals, as well as leaves, twigs, etc. Slaughtered animals consist of organic matter but exogenous organic matter may also be incorporated into samples to be lysed. Living things are described as organic since they are composed of organic compounds. Examples of organic compounds are carbohydrates, lipids, proteins and nucleic acids. Since they are comprised of carbon-based compounds, they are broken down into smaller, simpler compounds through decomposition and through lysing. Living organisms also excrete or secrete material that is considered an organic material. Organic matter may consist of microbes and microbial colonies. Organic matter also refers to bacteria, viruses, spores, fungi, prions, and other infectious material found in nature.

As used herein, "animal" refers to any organism classified as an animal, which may include, but are not limited, humans, domestic and farm animals, and zoo, sports, or pet animals, such as dogs, cats, cattle, horses, sheep, pigs, goats, rabbits, fish, insects, reptiles, birds etc.

As used herein, "blood cells" in the sense of the embodiments are blood cells having or not having a cell nucleus, i.e. nucleated or non-nucleated cells. Non-nucleated red blood cells not having a cell nucleus are e.g. the mature red blood cells as found in the circulation of animals. The embodiments also relate to nucleated blood cells as e.g. known from avian species. The later ones would meet the criteria for eukaryotic or nucleated cells.

As used herein, a "eukaryotic cell" or a "nucleated cell" in the sense of the embodiments is a cell derived from a eukaryotic organism and is still has its cell nucleus. Examples of eukaryotic cells are cells derived from nucleated tissue, nucleated tissue culture cells and nucleated blood cells. In a preferred embodiment the eukaryotic cell is a nucleated blood cell like a thrombocyte, a monocyte, neutrophils, eosinophils or a leukocyte.

As used herein, "cells from lower organisms" may include, but are not limited, bacteria, viruses, fungi, prions, etc. These cells contain genetic material, but they are not eukaryotic cells.

Further, as used herein, wastewater is any water used to transport waste, and is most commonly a synonym for:

Sewage (also called domestic wastewater, municipal wastewater)—this is wastewater that is produced by a community of people Blackwater (waste), household wastewater that only contains the discharge from toilets Greywater, household wastewater excluding the discharge from toilets Fecal sludge, household wastewater generated from certain types of onsite sanitation systems The generic term may be used to describe water containing differing contaminants from other uses, including:

Industrial wastewater, water-borne waste from power generation, manufacturing operations and mineral extraction, including Backwashing (water treatment), flushing accumulated particles from filter beds Boiler blowdown, impurities concentrated by steam generation Brine, waste streams from water softening, ion exchange, reverse osmosis, or desalination Wet scrubber effluent, containing pollutants removed from smokestack combustion gases to meet air quality goals Acid mine drainage, from dewatering coal and metal mines Produced water, a byproduct extracted with petroleum or natural gas Leachate, precipitation containing pollutants dissolved while percolating through ores, raw materials, products, or solid waste;

Return flow, carrying suspended soil, pesticide residues, or dissolved minerals and nutrients from irrigated cropland;

Surface runoff, precipitation carrying dissolved or suspended materials potential damaging to aquatic habitats, including:

Urban runoff, water used for outdoor cleaning activity and landscape irrigation in densely populated areas Cooling water, released with potential thermal pollution after use to condense steam or reduce machinery temperatures by conduction or evaporation Additionally, as used herein, the expression "oxidizing agent" refers in chemistry to a sub stance that has the ability to oxidize other substances—in other words, to cause them to lose electrons. In one sense, an oxidizing agent is a chemical species that undergoes a chemical reaction that removes one or more electrons from another atom. In that sense, it is one component in an oxidation-reduction (redox) reaction. In the second sense, an oxidizing agent is a chemical species that transfers electronegative atoms, usually oxygen, to a substrate. Common oxidizing agents may include, but are not limited, oxygen ($O_2$), superoxide ($O_2^-$), urea, peracetic acid, ozone, peroxides, including hydrogen peroxide and other inorganic peroxides, Fenton's reagents, halogens, such as fluorine and chlorine, nitric acid, nitrate and nitrate compounds, sulfuric acids, including peroxydisulfuric acid and peroxymonosulfuric acid, hypochlorite, chlorite, perchlorite, sodiumhypochlorite, chlorate, perchlorate, chromium, chromic and dichromic acids and chromium trioxide, pyridinium chlorochromate, and cerium (IV) compounds such as ceric ammonium nitrate and ceric sulfate. This list is used as an example but is not inclusive of all known oxidizing agents.

As used herein, the expression an "Augmented Oxidizing Agent" (AOA) refers to an oxidizing agent that has been exposed a certain wavelength or wavelengths of radiation that causes photons and/or phonons to create Electronically Modified Oxygen Derivatives (EMODs). EMODs are generated through a synergistic chemical reaction of oxidizing agents and the photons and/or phonons. EMODs are chemically reactive chemical species containing oxygen. Examples of EMODs include peroxides, superoxide, hydroxyl radical, trioxygen, and singlet oxygen.

As used herein, the term "radiation" refers in physics to the emission or transmission of energy in the form of waves or particles through space or through a material medium. This includes, but is not limited to: (1) electromagnetic radiation, such as radio waves, microwaves, ultraviolet light, visible light, x-rays, and gamma (γ) radiation, (2) particle radiation, such as alpha (α) radiation, beta (β) radiation, and neutron radiation (particles of non-zero rest energy), (3) acoustic radiation, such as ultrasound, sound, and seismic waves (dependent on a physical transmission medium), and (4) gravitational radiation, radiation that takes the form of gravitational waves, or ripples in the curvature of spacetime. Electromagnetic radiation can be described in terms of a stream of mass-less particles, called photons, each traveling in a wave-like pattern at the speed of light. Each photon contains a certain amount of energy. The different types of radiation are defined by the amount of energy found in the photons. Radio waves have photons with low energies, microwave photons have a little more energy than radio waves, infrared photons have still more, then visible, ultraviolet, X-rays, and the most energetic of all, gamma-rays. The photon is a type of elementary particle. It is the quantum of the electromagnetic field including electromagnetic radiation such as light and radio waves, and the force carrier for electromagnetic force. A photon is the smallest discrete amount or quantum of electromagnetic radiation. It is the basic unit of all light. Photons are massless, so they always move at the speed of light in vacuum, 299792458 m/s (or about 186,282 mi/s). Like all elementary particles, photons are currently best explained by quantum mechanics and exhibit wave-particle duality, their behavior featuring properties of both waves and particles. Biophotons are photons of light in the ultraviolet and low visible light range that are produced or utilized by a biological system. They are non-thermal in origin, and the emission of biophotons is technically a type of bioluminescence, though bioluminescence is generally reserved for higher luminance luciferin/luciferase systems. When a "photon" gets to a material, it is absorbed by the material. The material then sets up an internal electromagnetic vibration that isn't precisely a "photon" (it's called a phonon to be specific). The phonon has a less-than-light velocity that depends on the properties of the material. A phonon is a definite discrete unit or quantum of vibrational mechanical energy, just as a photon is a quantum of electromagnetic or light energy. At each frequency, quantum mechanics principles dictate that the vibrational energy must be a multiple of a basic amount of energy, called a quantum, that is proportional to the frequency. Physicists call these basic levels of energy phonons. In a sense, then, "phonon" is just a fancy word for a particle of heat.

There are two types of atomic motion in a liquid: phonon motion and the diffusional motion due to an atom jumping between two equilibrium positions. In turn, the phonon and diffusional motion consists of kinetic and potential parts, giving the liquid energy as $$E=K_l+P_l+K_s(\omega>\omega_F)+P_s(\omega>\omega_F)+K_d+P_d \quad (1)$$

where Kl and Pl are kinetic and potential components of the longitudinal phonon energy, $Ks(\omega>\omega F)$ and $Ps(\omega>\omega F)$ are kinetic and potential components of the energy of shear phonons with frequency $\omega>\omega F$ and Kd and Pd are kinetic and potential energy of diffusing atoms. Diffusion is the net movement of anything (for example, atoms, ions, molecules, energy) from a region of higher concentration to a region of lower concentration. Diffusion is driven by a gradient in concentration. So, phonon motion (heat motion) and diffusion motion work together so that temperature and composition are the same throughout a liquid.

In an example, some particles of a different temperature are dissolved in a glass of water. At first, the particles are all near one top corner of the glass. If the particles randomly move around ("diffuse") in the water, they eventually become distributed randomly and uniformly from an area of high concentration to an area of low concentration, and organized (diffusion continues, but with no net flux). Likewise, the temperature also equalizes between the particles and the liquid as a function of the phonon's activity.

In practice, most materials are filled with an ever-changing mix of phonons that have different frequencies and are traveling in different directions, all superimposed on each other, in the same way that the seemingly chaotic movements of a choppy sea can (theoretically) be untangled to reveal a variety of superimposed waveforms of different frequencies and directions. But, unlike photons (the particles that carry light or other electromagnetic radiation), which generally don't interact at all if they have different wavelengths, phonons of different wavelengths can interact and mix when they bump into each other, producing a different wavelength. This makes their behavior much more chaotic and thus difficult to predict and control.

Photoexcitation is the production of an excited state of a quantum system by photon absorption. The excited state originates from the interaction between a photon and/or phonon and the quantum system. On the atomic and molecular scale photoexcitation is the photoelectrochemical process of electron excitation by photon absorption when the energy of the photon is too low to cause photoionization. Multi-photon absorption (MPA) or multi-photon excitation or non-linear absorption is the simultaneous absorption of two or more photons of identical or different frequencies in order to excite a molecule from one state (usually the ground state) to a higher energy, most commonly an excited electronic state. Multi-photon absorption is one of a variety of multi-photon processes. In this specific process, two or more photons are absorbed by a sample simultaneously. Neither photon is at resonance with the available energy states of the system, however, the combined frequency of the photons is at resonance with an energy state. In quantum mechanics, an excited state of a system is any quantum state of the system that has a higher energy than the ground state (that is, more energy than the absolute minimum). Absorption of two or more photons with different frequencies is called non-degenerate multi-photon absorption. Since MPA depends on the simultaneous absorption of two or more photons, the probability of MPA is proportional to the square of the light intensity, thus it is a nonlinear optical process. The energy difference between the involved lower and upper states of the molecule is equal or smaller than the sum of the photon energies of the two or more photons absorbed. Multi-photon absorption is a third-order process, with absorption cross section typically several orders of magnitude smaller than one-photon absorption cross section.

Water absorbs UV radiation near 125 nm exiting the 3a1 orbit leading to dissociation into $OH^-$ and $H^+$. Through MPA this dissociation can be achieved by two or more photons at other nm wavelengths. This creates reactions and products that have been not previously reported or understood until this patent application. Multi-photon absorption and two photon absorption are the terms used to describe a process in which an atom or molecule makes a single transition between two of its allowed energy levels by absorbing the energy from more than a single photon.

Chemi-excitation via oxidative stress by reactive oxygen species, ROS, reactive nitrogen species, RNS, and/or catalysis by enzymes (i.e., peroxidase, lipoxygenase) is a common event in biomolecular systems. The embodiments relate to utilizing photons and phonons in a synergistic chemi-excitation process that generates reactive oxygen species (ROS) and electronically modified oxygen derivatives (EMODs). Such reactions can lead to the formation of triplet excited species such as trioxygen. This process is a contributing factor to spontaneous biophoton emission and has been indicated by studies demonstrating that biophoton emission can be increased by depleting assayed tissue of antioxidants or by addition of carbonyl derivatizing agents. Further support is provided by studies indicating that emission can be increased by addition of electronically modified oxygen derivatives such as hydroxyl radicals, hydroperoxides, singlet oxygen, hydrogen, superoxide, and others. All electromagnetic radiation, radio waves through x-rays, moves in vacuum at a universal speed. This is the speed of light, $c=30,000,000,000$ centimeters per second (usually written in powers of ten, $c=3\times10 /\wedge10$ cm/sec).

The constant value of the speed of light in vacuum goes against our intuition: it is expected that high energy (short wavelength) radiation would move faster than low energy (long wavelength) radiation. Light can be considered as a stream of minute packets of energy, photons and biophotons and generating phonons, which creates a pulsating electromagnetic disturbance. A single photon or biophoton differs from another photon or biophoton only by its energy. In empty space (vacuum), all photons and biophotons travel with the same speed or velocity. Photons and biophotons are slowed down generating phonons when they interact with different media such as water, glass or even air. This slowing down accounts for the refraction or bending of light. Refraction is the bending of a wave when it enters a medium where its speed is different. The refraction of light when it passes from a fast medium to a slow medium bends the light ray toward the normal to the boundary between the two media. The amount of bending depends on the indices of refraction of the two media and is described quantitatively by Snell's Law. As the speed of light is reduced in the slower medium, the wavelength is shortened proportionately. The energy of the photon and biophotons is not changed, but the wavelength is. This comes into play below when wavelengths of dissociation are discussed. Different energy photons and biophotons are slowed by different amounts in glass or water or other substances; this leads to the dispersion of electromagnetic radiation and phonons. Greater intensity of light means only that more photons were available to hit a target per second and more electrons could be ejected from a target, not that there was more energy per photon or biophoton.

The energy of the outgoing electrons depends on the frequency of photons used. There are two kinds of interactions through which photons deposit their energy; both are with electrons. In one type of interaction the photon loses all its energy; in the other, it loses a portion of its energy, and the remaining energy is scattered generating phonons. The energy (E) of the incoming photons and biophotons is directly proportional to the frequency which can be written as $E=hf$ in which h is a constant. Max Planck first proposed this relationship between energy and frequency in 1900 as part of his study of the way in which heated solids emit radiation. In one example, the photoelectric (photon-electron) interaction, a photon transfers all its energy to an electron located in one of the atomic shells. The electron is ejected from the atom by this energy and begins to pass through the surrounding matter. The electron rapidly loses its energy and moves only a relatively short distance from its original location. The photon's energy is, therefore, deposited in the matter close to the site of the photoelectric interaction. The energy transfer is a two-step process. The photoelectric interaction in which the photon transfers its energy to the electron is the first step. The depositing of the energy in the surrounding matter by the electron is the second step. Phonons and electrons are the two main types of elementary particles or excitations generated with photon reactions.

If the binding energy is more than the energy of the photon, a photoelectric interaction cannot occur. This interaction is possible only when the photon has sufficient energy to overcome the binding energy and remove the electron from the atom or a MPA reaction can occur depositing more energy. The photon's energy is divided into two parts by the interaction. A portion of the energy is used to overcome the electron's binding energy and to remove it from the atom.

The remaining energy is transferred to the electron as kinetic energy (phonon) and is deposited near the interaction site. Since the interaction creates a vacancy in one of the electron shells, typically the K or L, an electron moves down to fill in. The drop in energy of the filling electron often produces a characteristic x-ray photon. The energy of the characteristic radiation depends on the binding energy of the electrons involved. Characteristic radiation initiated by an incoming photon is referred to as fluorescent radiation. Fluorescence, in general, is a process in which some of the energy of a photon is used to create a second photon of less energy. This process sometimes converts x-rays into light photons. Whether the fluorescent radiation is in the form of light or x-rays depends on the binding energy levels in the absorbing material. In the embodiments, the linear attenuation coefficient ($\mu$) is the actual fraction of photons interacting per 1-unit thickness of material. Linear attenuation coefficient values indicate the rate at which photons interact as they move through material and are inversely related to the average distance photons travel before interacting. The rate at which photons interact (attenuation coefficient value) is determined by the energy of the individual photons or the MPAs and the atomic number and density of the material. This is important due to the activation of the enhanced antimicrobial oxidizing agent used in the embodiments. In some situations, it is more desirable to express the attenuation rate in terms of the mass of the material encountered by the photons and or phonons rather than in terms of distance. The quantity that affects attenuation rate is not the total mass of an object but rather the area mass. Area mass is the amount of material behind a 1-unit surface area, and can be shown as, the area mass is the product of material thickness and density: Area Mass $(g/cm2)$=Thickness $(cm)\times$ Density $(g/cm3)$.

The mass attenuation coefficient, using this formula, is the rate of photon and or phonon interactions per 1-unit $(g/cm2)$ area mass. By establishing a linear attenuation coefficient that does not diminish too rapidly with the functioning distance so that sufficient numbers of photons and or phonons are available for enhancement of the oxidizing agent an effective enhanced antimicrobial or enhanced catalyzed, or enhanced bleaching agent or enhanced other effects of reactive oxygen species and oxidizing agent can be generated for use in the embodiments' process in plasma, liquid, gas, solid or a combination of these states of matter. It is also displayed in this patent's agglomeration process.

Brownian diffusion is the characteristic random wiggling motion of small particles, resulting from constant bombardment by surrounding molecules. Such irregular motions of pollen grains in water were discovered in 1827 and later similar phenomena were found for small smoke particles in air. In agglomeration, suspended particles tend to adhere one to the other creating bigger and heavier aggregates. The agglomeration process consists of the transportation and collision of particles, and the attachment of the particles. Understanding particle agglomeration and aggregation and the mechanisms that cause such assemblies, such as diffusion, is important in a wide range of processes and applications.

Aggregation and agglomeration are two terms that are used to describe the assemblage of particles in a sample but clustering via agglomeration is irreversible. The main transport mechanisms by which particles can collide are Brownian motion, laminar or turbulent flow or relative particle settling and gravitational agglomeration. Gravitational agglomeration, which is dependent on the size of the particles and their terminal velocity, is one of the main focuses of this technology relating to the separation of particles in air, solutions or associated with a compound or material. Slowly settling particles interact with the more rapidly settling particles, leading to the formation of clusters. This process can be called agglomeration. Several different basic effects have been studied as being responsible for particle collision and agglomeration, which are mainly orthokinetic and hydrodynamic forces. In case of orthokinetic collisions the effective agglomeration rate constant or agglomeration input can be described as a product of the collision rate constant and an efficiency factor:

$$\beta = \psi(\varepsilon, \sigma) \beta coll$$

$\beta coll$ increases linearly with the shear rate $\gamma$, that equals $\varepsilon/\nu$ in a turbulent stream, whereas the efficiency factor $\psi$ decreases strongly with $\gamma$ in this high shear region, and thus $\beta$ also decreases after having reached a maximal value at a rather low shear rate value. Although $\beta$ should be size-dependent, experimental agglomeration data can often be fitted with a size-independent input. It has been shown that $\beta coll$ has a dependence on the mean particle size. The efficiency factor includes the supersaturation dependence that is needed for the cementation of the particles. Brownian diffusion is instrumental in particle size selection for diffusion of photon/phonon enhanced oxidizing agent solutions dispersed in a fog, mist, vapor, spray, bolus, drop, stream or other methods of dispersion.

The embodiments described herein provide uses of the photon/phonon augmented oxidizing agent, AOA, system that involves the dissociation of wastewater, microbes, blood and other animal fluids. This technology finds application in a decontamination system whereby wastewater, microbes, organic matter and blood components go through the described agglomeration process whereby photon and phonon augmented oxidizing agents, AOA, are added to the liquid containing microbes, organic matter and/or blood causing dissociation of the organic matter including blood into constituent components allowing for these components to be used for their water value and nutritional value and other desired purposes.

The word "radiation" arises from the phenomenon of waves radiating (i.e., traveling outward in all directions) from a source. This aspect leads to a system of measurements and physical units that are applicable to all types of radiation. The photon (Greek: φῶς, phōs, light) is a type of elementary particle. It is the quantum of the electromagnetic field including electromagnetic radiation such as light and radio waves, and the force carrier for the electromagnetic force. Photons are massless, so they always move at the speed of light in vacuum, 299792458 m/s (or about 186,282 mi/s). Because such radiation expands as it passes through space, and as its energy is conserved (in vacuum), the intensity of all types of radiation from a point source follows an inverse-square law in relation to the distance from its source. Like any ideal law, the inverse-square law approximates a measured radiation intensity to the extent that the source approximates a geometric point. Some of the ultraviolet spectrum that begins above energies of 3.1 eV, a wavelength less than 400 nm is non-ionizing, but is still biologically hazardous due to the ability of single photons of this energy to cause electronic excitation in biological molecules, and thus damage them by means of certain reactions. This property gives the ultraviolet spectrum some of the properties of ionizing radiation in biological systems without actual ionization occurring. In contrast, visible light and longer-wavelength electromagnetic radiation, such as infrared, microwaves, and radio waves, consists of photons with too little energy to cause damaging molecular excitation.

Light, or visible light, is a very narrow range of electromagnetic radiation of a wavelength that is visible to the human eye, or 380-750 nm which equates to a frequency range of 790 to 400 THz respectively. More broadly, physicists use the term "light" to mean electromagnetic radiation of all wavelengths, whether visible or not.

As used herein, the singular forms "a", "an", and "the" include plural references unless the context clearly dictates otherwise. By way of example, "a red blood cell" means one red blood cell or more than one red blood cell. All numerical values within the detailed descriptions and the claims herein are modified by "about" or "approximately" the indicated value and take into account experimental error and variations that would be expected by a person having ordinary skills in the art.

Reference will now be made in detail to exemplary embodiments of the disclosure.

While the disclosure will be described in conjunction with the exemplary embodiments, one skilled in the art can understand that it is not intended to limit the disclosure to those embodiments. Any combination, devices or methods provided herein can be combined with one or more of any of the other combination, devices and methods provided herein. To the contrary, the embodiments are intended to cover alternatives, modifications, and equivalents as may be included within the spirit and scope of the disclosure as defined by the appended claims.

In a first exemplary embodiment, the embodiments relate to a method of hemolyzing a quantity of liquid including water, dairy products, animal fluids including blood and suspected or known blood components comprising plasma, BOD, TDS, TSS, eukaryotic cells, and other components of water, animal fluids, and blood by application of Augmented Oxidizing Agents (AOA) containing EMODs to the target blood or liquid. The EMODs are components involved in the killing response of immune cells in response to microbial invasion. Recent evidence has shown that they play a key role as a messenger in normal cell signal transduction and cell cycling.

These reactive molecules are formed by a number of different mechanisms in nature, but the process as described herein forms them in numbers greater than found in nature. The process described herein also produces EMODs that exist for a longer duration than typically found in nature. The below table illustrates research showing the increased effectiveness as well as the increased time (4 weeks) or shelf life of the increased effectiveness.

TABLE 1

Week 4

| Test Microorganism | Contact Time | Test Substance | Replicate | CFU/ Carrier | Average Percent Reduction Compared to Controls | Average $Log_{10}$ Reduction Compared to Controls |
|---|---|---|---|---|---|---|
| E. coli ATCC 11229 | Pre-Treatment | Numbers Control | 1 | 3.90E+04 | N/A | N/A |
| | 10 Minutes | Control Substance | 1 | 3.00E+04 | 23.08% | 0.11 |
| | | Sample 1 | 1 | 6.00E+03 | 84.62% | 0.81 |
| | | Sample 2a | 1 | 9.00E+03 | 76.92% | 0.64 |

Some examples of EMODs are superoxide; trioxygen, singlet oxygen; hydrogen peroxide; hydroxyl radical; hydroxyl ion; and nitric oxide. These EMODs are generated by Augmenting Oxidizing Agents with radiation of a certain wavelength, generally between 300 nm and 600 nm, where the interaction of these agents, oxidizing agents and radiation (photons and/or phonons), when combined produce a total effect that is greater than the sum of the effects of the individual agents. This radiation exposure generates EMODs that last longer than typically found in nature by evidence of a residual effect which research has shown as an increased effect where the increased effect lasts for days, thereby providing an AOA. The expected EMODs' life span when they are found naturally in nature is generally measured in nanoseconds. Exposing oxidizing agents to photons between 300 nm and 600 nm produces an AOA having unique EMODs that exhibits a residual effect demonstrated by its existence for hours, days, weeks and greater extended periods of time. The radiation wavelength of between 300 nm and 600 nm may be produced from a variety of sources such as LEDs, lasers, natural light, electromagnetic radiation, arc lamps and other suitable sources. The list of radiation producing sources is not meant to limit sources to those listed but to serve as an example.

Processing of said target water, microbes, animal fluids and/or blood with an AOA containing EMODs in solution, which is a result of an oxidizing agent that has been exposed to radiation of certain wavelengths where the interaction of oxidizing agent and photons and phonons, when combined, produce a total effect that is greater than the sum of the effects of these individual components, under conditions appropriate to lyse cell membranes of microbes, organic matter, animal fluids, blood cells and at the same time causing or not causing precipitation of sample constituents depending on need, potentially subjecting the processed sample obtained in the first step to separation into desired components such as liquids and solids.

The below Table 1 shows actual testing results that illustrate the residual effect of Augmented Oxidizing Agents (AOAs) containing EMODs created by methods of the described embodiments. The test substance was a solution of 3% hydrogen peroxide, which was exposed to radiation to form the AOA containing EMODs. The test substance or AOA was applied to target, which included a carrier with a viable bacteria concentration of anaerobic bacteria *Staphylococcusepidermidis* ATCC 12228. The AOA was applied 1 minute, 5 minutes, 10 minutes, 30 minutes, 1 hour, 12 hours, 24 hours, 2, days, 5 days, and 7 days after radiation exposure. After 7 days, AOA was again subjected to radiation for reactivation.

TABLE 2

| Test Microorganism | Contact time | Test Substance | Replicate | CFU/ML | Average CFU/ML | % reduction Compared to controls | LOG 10 Reduction compared to controls |
|---|---|---|---|---|---|---|---|
| S. aureus ATCC 6538 | 0 | Control | 1 | 3.32E+06 | 3.43E+06 | N/A | N/A |
| S. aureus ATCC 6538 | 0 | Control | 2 | 2.90E+06 | 3.43E+06 | N/A | N/A |
| S. aureus ATCC 6538 | 0 | Control | 1 | 3.90E_06 | 3.43E+06 | N/A | N/A |
| S. aureus ATCC 6538 | 0 | Control | 2 | 3.60E+06 | 3.43E+06 | N/A | N/A |
| S. aureus ATCC 6538 | 5 minutes | 1 ppm $H_2O_2$ no photon activation | 1 | 4.10E+06 | 4.05E+06 | No reduction | No reduction |
| S. aureus ATCC 6538 | 5 minutes | 1 ppm $H_2O_2$ no photon activation | 2 | 4.10E+06 | 4.05E+06 | No reduction | No reduction |
| S. aureus ATCC 6538 | 5 minutes | .3% $H_2O_2$ no photon activation | 1 | 4.10E+06 | 4.05E+06 | No reduction | No reduction |
| S. aureus ATCC 6538 | 5 minutes | .3% $H_2O_2$ no photon activation | 2 | 4.00E+06 | 4.05E+06 | No reduction | No reduction |
| S. aureus ATCC 6538 | 5 minutes | 1 ppm with photon activation | 1 | Less than 1.00E+01 | Less than 1.00E+01 | Greater than 99.997% | Greater than 5.54 |
| S. aureus ATCC 6538 | 5 minutes | 1 ppm with photon activation | 2 | Less than 1.00E+01 | Less than 1.00E+01 | Greater than 99.997% | Greater than 5.54 |
| S. aureus ATCC 6538 | 5 minutes | .3% with photon activation | 1 | Less than 1.00E+01 | Less than 1.00E+01 | Greater than 99.997% | Greater than 5.54 |
| S. aureus ATCC 6538 | 5 minutes | .3% with photon activation | 2 | Less than 1.00E+01 | Less than 1.00E+01 | Greater than 99.997% | Greater than 5.54 |

There are statistical variations but when comparing the increased activation of the AOAs at 1 minute post augmentation with AOA that was augmented 7 days previously, the results are very similar. The Augmented Oxidizing Agent exhibits a pronounced residual effect. This residual effect is evidenced by the antimicrobial effect of the AOAs. The un-augmented oxidizing agents have been shown to exhibit an antimicrobial effect of approximately 30% at a dwell time of 5 minutes. The radiation of between 300 nm and 600 nm has been shown to kill approximately 1% of the microbes that are exposed to it for 5 minutes. The Augmented Oxidizing Agents demonstrate an antimicrobial effect over 100% greater than un-augmented oxidizing agents. This effect provides a concentration of an oxidizing agent with double the antimicrobial effect or a concentration of AOA can be utilized that is 50% or less of the concentration of the un-augmented oxidizing agent and exhibit the same antimicrobial activity.

Another exemplary embodiment relates to the use of a solubilizing agent that includes an AOA, which contains EMODs, in the processing of a blood sample for separation and to the use of a processed blood sample obtained by separation so that its components may be discarded or repurposed individual or in subsets. The AOA results from an oxidizing agent exposed to radiation of certain wavelengths, and the interaction of the oxidizing agent and radiation, when combined, produce an AOA having a total effect that is greater than the sum of the effects of the oxidizing agent and radiation. The EMODs may be generated by exposing the oxidizing agent or agents to radiation (photons and/or phonons) of certain wavelengths before the oxidizing agent is applied to a target or exposing the oxidizing agent to radiation while the oxidizing agent is applied to a target or applying an oxidizing agent or oxidizing agents to a target then exposing the entire mixture to radiation of certain wavelengths.

The sample or target material includes organic matter, which pertains to any carbon-based compound that exists in nature. For example, living things are described as organic since they are composed of organic compounds. Examples of organic compounds are carbohydrates, lipids, proteins and nucleic acids. Since they are comprised of carbon-based compounds, they are broken down into smaller, simpler compounds through decomposition and through lysing. Living organisms also excrete or secrete material that is considered an organic material. The organic matter from blood may contain useful substances that contribute a value when separated from milk, blood, or other animal fluids which are suspected or known to comprise nucleated cells, non-nucleated cells, cell components, microbes and organic matter. This organic matter contains substances that can be repurposed as food sources, as fertilizer, as medicines or and other uses.

An exemplary embodiment relates to a method comprising the steps of processing a sample or target material that includes organic matter with a membrane solubilizing agent consisting of an oxidizing agent such as oxygen ($O_2$), superoxide ($O_2^-$), urea, peracetic acid, ozone, hydrogen peroxide, other inorganic peroxides, Fenton's reagents, fluorine, chlorine, halogens, nitric acid, nitrate compounds, sulfuric acids, peroxydisulfuric acid, peroxymonosulfuric acid, hypochlorite, chlorite, perchlorite, halogen compounds, sodiumhypochlorite, chlorate, perchlorate, chromium, chromic and dichromic acids, chromium trioxide, pyridinium chlorochromate, cerium (IV) compounds such as ceric ammonium nitrate and ceric sulfate and other agents.

This list is used as an example but is not inclusive of all oxidizing agents. The oxidizing agent is exposed to radiation with a wavelength from 0.01 nm to 845 nm. It may be appreciated that 84 nm is the upper wavelength that photolyzes oxygen to oxygen bonds in water and 0.01 nm is the lower limit of x-ray photons. This creates an augmented oxidizing agent, AOA, that contain more EMODs than similar substances found in nature. These excess EMODs generate a newly discovered residual effect whereby the EMODs last for an extended period of time.

The EMODs are components of the killing response of immune cells to microbial invasion. Recent evidence has shown that they play a key role as a messenger in normal cell signal transduction and cell cycling. These reactive molecules are formed by a number of different mechanisms in nature but the process described in this patent forms them in numbers greater than found in nature. Some examples of EMODs are superoxide; hydrogen peroxide; hydroxyl radical; hydroxyl ion; and nitric oxide thereby lysing cell membranes of blood cells, nucleated cells, non-nucleated cells, cell components, microbes, organic matter and microbial cells. This method results in a product that is free of most if not all microbes, bacteria, viruses, spores, fungi, prions, and other infectious material found in nature, has a lowered BOD, TDS and TSS and includes components that can be discarded or repurposed.

For example, blood contains 16 to 18 percent protein solids and dried blood meal is a valuable ingredient in feed for non-ruminant animals because. Blood meal is also used as a high-nitrogen fertilizer. In an exemplary embodiment, the embodiments relate to a method of lysing a quantity of animal fluids, blood, blood cells, microbes, and organic matter and suspected or known blood components comprised of plasma, BOD, TDS, TSS, eukaryotic cells, microbes, bacteria, viruses, spores, fungi, prions, and other infectious material and other passible components of blood by application of AOAs comprising EMODs to a target blood sample. These Augmented Oxidizing Agents comprising the Electronically Modified Oxygen Derivatives are generated by exposing oxidizing agents to radiation/photons of a certain wavelength where the interaction of the oxidizing agents and radiation/photons produce a total effect that is greater than the sum of the effects of the oxidizing agents or radiation alone. This radiation exposure generates EMODs that last longer than typically found in nature by evidence of a residual effect which research has shown as an increased antimicrobial effect that lasts for over 7 days. Processing and lysing of said animal fluids, blood, blood cells, blood sample, microbes, and organic matter with an AOA comprising EMODs provides a total effect that is greater than the sum of the effects of the oxidizing agent or radiation under conditions appropriate to lyse cell membranes of animal fluids, blood, blood cells, microbes and organic matter and at the same time causing or not causing precipitation of sample constituents depending on need, potentially subjecting the processed sample obtained in the first step to separation into desired components such as liquids and solids. EMODs are components of the killing response of immune cells to microbial invasion. Recent evidence has shown that they play a key role as a messenger in normal cell signal transduction and cell cycling. These reactive molecules are formed by a number of different mechanisms in nature, but the process described in this patent forms them in numbers greater than found in nature and creates EMODs that exist for a longer period of time then EMODs naturally found in nature. Some examples of chemicals containing EMODs are superoxide; hydrogen peroxide; hydroxyl radical; hydroxyl ion; and nitric oxide.

It may be desired to inactivate substances found in a sample including blood or other target materials that reduce the effectiveness of AOA with EMODs. This can be done, for example, by adjusting the pH of the sample or target material or by exposing the target material to temperatures that denature the substance or enzyme that reduces the effectiveness of the AOA. The adjustment of the pH or exposure to such temperatures may be carried out before, during, and/or after the sample or target material is contacted or exposed to the AOA. A combination of temperature changes and pH changes may also be used.

During the storage or transport of the target water, blood, blood cells, body fluids, etc., other exogenous organic matter may be incorporated into the sample. For example, slaughtered animals consist of organic matter, but exogenous organic matter may also be incorporated into samples before being lysed. This exogenous matter may include microbes or microbial colonies that exist in the collected sample either before or after lysing. Some substances contained in a sample of organic material may destroy or reduce the effectiveness of AOA. These substances may contain or consist of enzymes such as catalase. To increase the effectiveness of AOAs, a solution of AOA may be heated to a point where the substance that adversely effects the oxidizing agent is reduced in effectiveness or destroyed. This may also be accomplished by cooling an AOA solution to a point that leaves the substance that adversely effects the AOA reduced in effectiveness or destroyed.

In another exemplary embodiment, the embodiments relate to a method of hemolyzing a sample known or suspected to comprise water, blood and blood cells and/or suspected or known to comprise eukaryotic cells, blood components, or blood products, the method comprising the steps of a) processing said sample with a solubilizing agent consisting of an oxidizing agent that has been exposed to certain wavelengths of radiation/photons, when combined produce a total effect that is greater than the sum of the effects of the oxidizing agent and radiation (i.e. an AOA with EMODs), under conditions appropriate to lyse cell membranes of blood cells and at the same time causing or not causing precipitation of constituents, b) subjecting the processed sample obtained in step (a) to separation, and c) qualifying and quantifying the analyte.

The advantageous properties of hemolysis as demonstrated in the embodiments have been established by using blood samples, i.e. of processing a sample with a solubilizing agent according to the embodiments under conditions appropriate to lyse cell membranes of blood cells, microbial cells, BOD, TDS, TSS and other components in blood and at the same time not to cause or to cause, based on the desired outcome, precipitation of sample constituents. However, other liquid samples may be used and processed in a similar way. A sample according to the embodiments may be any sample as investigated in processing routine, like wastewater, urine, cerebrospinal fluid, plasma, blood or other parts of animals.

In other exemplary embodiment, a sample subjected to a differential hemolysis with an appropriate solubilizing agent comprises blood cells and may comprise or comprises nucleated cells or non-nucleated cells. Alternatively, the liquid sample may comprise both blood cells and nucleated cells and non-nucleated cells. The sample according to the embodiments may also be blood. As will be appreciated a whole blood sample contains both red blood cells without nuclei as well as nucleated blood cells. These nucleated and non-nucleated cells make up a significant portion of the BOD, TDS and TSS.

The blood sample may be processed directly, i.e. directly after collecting in the method according to the embodiments or indirectly, i.e. after a period of time. The blood sample may or may not be treated at all before it is subjected to the hemolysis according to the embodiments. This treatment may consist of coagulation, anticoagulation, addition of a flocculant and/or clarifying agent, filtering, cooling, heating, the application of sonic or ultrasonic energy, ultraviolet or other light therapy, antimicrobial agents and other commercially available processes that may apply. Also, the blood may be collected and treated or not treated with an appropriate anti-coagulant to yield an anti-coagulated blood sample, before it is hemolysed. Well-known anti-coagulants frequently used may consist of heparin, citrate and EDTA but not limited to.

In an exemplary method according to the embodiments the blood sample is treated with solubilizing agent consisting of an AOA, which has been prepared from an oxidizing agent that has been exposed to radiation between 300 nm and 600 nm. This combination of oxidizing agent and radiation generates an AOA with EMODs that exhibit antimicrobial properties, lysing properties and residual effects. This list of properties is not meant as all inclusive but instead is meant to illustrate some of the effects of the AOAs. The EMODs work in such a manner that two requirements are met: a) if blood cells are present, the membranes of blood cells are disrupted and b) at the same time no precipitation of sample constituents is caused unless precipitation is desired.

This process is termed hemolysis. In the event the method is practiced on blood, a processed sample is obtained containing lysed blood cells but at the same no precipitate is formed unless it is desired. The solubilizing agent consists of an oxidizing agent that has been exposed to wavelengths of radiation/photons between 300 nm and 600 nm. That is, the solubilizing agent consists of an AOA. This exposure can be before the AOA is applied to a target, while the AOA is applied to a target or after the AOA is applied to a target or a combination of the above applications of radiation.

The membrane solubilizing agent consisting of AOAs according to the embodiments will bring about the lysis of the cells and constituents of cells present in a sample. These constituents may consist of any carbon-based compound that exists in nature or exist in living things. Examples of associated compounds are carbohydrates, lipids, proteins and nucleic acids. Since they are comprised of carbon-based compounds, they are broken down into smaller, simpler compounds through decomposition and through lysing. Living organisms also excrete or secrete material that is considered an organic material. The organic matter from blood may contain useful substances that contribute a value when separated from the blood. These useful substances can be utilized as feed for animals and fertilizer for plants among other uses. Further, the AOA for hemolysis will bring about the lysis of microbial cells and their constituents in the sample. The term microbes is used to represent some or all of the following list but the list is used as an example but not meant to be all inclusive: bacteria, viruses, fungi, spores, prions and other known or yet unknown disease causing organisms.

For example, in an exemplary embodiment, the embodiments relates to a method for lysing a sample or target material comprising wastewater, animal fluids, blood, blood cells, nucleated blood cells, non-nucleated blood cells, cell components, microbes, bacteria, viruses, spores, fungi, prions, and/or organic matter to reduce or eliminate constituents selected from the group consisting of total dissolved solids (TDS), total suspended solids (TSS), BOD, minerals, proteins, microbes, bacteria, viruses, spores, fungi, and prions and combinations thereof so that the constituents can be separated from the target material. Steps in the method may include, for example, creating an AOA by exposing at least one oxidizing agent to radiation/photons between 300 nm and 600 nm, the AOA containing EMODS at a greater concentration then non-irradiated oxidizing agents. The target material is subjected to the AOA, e.g. by applying the AOA onto target material. The AOA may be created prior to applying to the target material, during or while the oxidizing agent is applied to the target material, and/or after the oxidizing agent is applied to the target material. The EMODs of the AOA lyse the target material by destroying cell walls, cell components, genetic material and other organic matter. Optionally, the target material may be subjected to cooling and/or heating before, during and/or after exposure to the AOA to inactivate substances, and/or pH adjustment before, during and/or after exposure to the AOA. Also, additional components, such as a flocculant, may be mixed with the target material before, during, and/or exposure to the AOA to facilitate separation. After the target material has been exposed to the AOA, e.g. by its application to the target material, separation may be performed by a centrifuge, a decanter, or a filter there after so that the resulting solid and/or liquid components may be collected.

Without wanting to be bound to the following theory one may assume that the advantageous balance found and established within the framework of the embodiments, at which the membrane of a blood cell is disrupted but at which at the same time no precipitation of sample constituents is caused is essential for overcoming at least some of the problems known from the art. By applying a suitable membrane solubilizing agent, AOA, under appropriate conditions the integrity of the cellular membrane that is e.g. essential for shielding the contents of a blood cell from the blood plasma is lost. The content of the erythrocytes (e.g. hemoglobin but also some analytes of interest) is released into the surrounding liquid. At the same time no precipitation of sample constituents is caused but may be allowed as desired.

As the skilled artisan will appreciate, sample constituents that might be a constituent in a latter analysis may especially be DNA and de-natured proteins, respectively. The integrity of blood cells can, for example, be assessed by appropriate stains. In a preferred embodiment according to the embodiments trypan blue is used in order to assess the integrity of a red blood cell, membrane of intact red blood cells do not accumulate trypan blue, whereas a red blood cell with a disrupted membrane does stain with trypan blue. The membrane integrity of a red blood cell is easily assessed under the microscope after staining a sample with trypan blue. The percentage of disrupted red blood cells is calculated by counting intact red blood cells before and after the treatment, by then dividing the first number by the latter number and by then multiplying this value. Red blood cells that are solubilized are referred to as lysed red blood cells or as lysed erythrocytes. The appropriate treatment will be adequate to lyse a blood cell, but at the same time it may or may not cause precipitation of sample constituents. It is expected that the appropriate hemolysis treatment in a method according to the embodiments will also affect the outer membranes of eukaryotic cells. The hemolysis reagent and the conditions for hemolysis used may not leave the nuclear membrane and thus the nuclei macroscopically intact or at least DNA will not be set free from its surrounding and DNA-stabilizing nuclear proteins. As indicated above, the conditions used in this method of hemolysis according to the embodiments can easily be assessed visually. If a blood sample is incubated with an appropriate reagent for hemolysis the minimal concentration required to hemolyze red blood cells can be recognized as the concentration rendering the turbid blood sample transparent or clear.

In another exemplary embodiment according to the embodiments a blood sample derived from an animal or a sample of blood derived from an animal will be subjected to the treatment with a membrane solubilizing agent as described in the embodiments may be accomplished without any additional step like filtration, precipitation or centrifugation or those steps may be used. The embodiments therefore relate to method of hemolyzing a sample of blood, comprising the steps of processing the sample with a membrane solubilizing agent under conditions appropriate to disrupt the membrane of said animal fluids, blood, blood cells, microbes, including bacteria, viruses, fungi, spores, prions and other known or yet unknown disease causing organisms, but not to destroy the nuclei of eukaryotic cells unless desired.

The effects of temperature and concentration on the rate of a reaction in chemical kinetics will be discussed as follows.

A decrease in temperature would have the opposite effect when compared to an increase in temperature. With an increase in temperature (more phonons), there is an increase in the number of collisions between reactants. Increasing the concentration of a reactant increases the frequency of collisions between reactants and will, therefore, increase the reaction rate. An increase in temperature corresponds to an increase in the average kinetic energy of the particles in a reacting mixture—the particles move faster, colliding more frequently and with greater energy. Increasing concentration tends to increase the reaction rate too.

The rate, or speed, at which a reaction occurs depends on the frequency of successful collisions. A successful collision occurs when two reactants collide with enough energy and with the right orientation. That means if there is an increase in the number of collisions, an increase in the number of particles that have enough energy to react, and/or an increase in the number of particles with the correct orientation, the rate of reaction will increase.

The rate of reaction is related to terms of three factors: collision frequency, the collision energy, and the geometric orientation. Remember that the collision frequency is the number of collisions per second. The collision frequency is dependent, among other factors, on the temperature of the reaction.

When the temperature is increased, the average velocity of the particles is increased. The average kinetic energy of these particles is also increased. The result is that the particles will collide more frequently, because the particles move around faster and will encounter more reactant particles. However, this is only a minor part of the reason why the rate is increased. Just because the particles are colliding more frequently does not mean that the reaction will definitely occur.

The major effect of increasing the temperature is that more of the particles that collide will have the amount of energy needed to have an effective collision. In other words, more particles will have the necessary activation energy.

At room temperature, the hydrogen and oxygen in the atmosphere do not have sufficient energy to attain the activation energy needed to produce water:

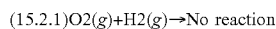(15.2.1)$O2(g)+H2(g) \rightarrow$ No reaction

At any one moment in the atmosphere, there are many collisions occurring between these two reactants. But what we find is that water is not formed from the oxygen and hydrogen molecules colliding in the atmosphere, because the activation energy barrier is just too high, and all the collisions are resulting in rebound. When we increase the temperature of the reactants or give them energy in some other way, the molecules have the necessary activation energy and are able to react to produce water:

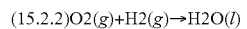(15.2.2)$O2(g)+H2(g) \rightarrow H2O(l)$

There are times when the rate of a reaction may need to be slowed down. Lowering the temperature could also be used to decrease the number of collisions that would occur and lowering the temperature would also reduce the kinetic energy available for activation energy. If the particles have insufficient activation energy, the collisions will result in rebound rather than reaction. Using this idea, when the rate of a reaction needs to be lower, keeping the particles from having sufficient activation energy will definitely keep the reaction at a lower rate. The humidity where the described reaction takes place effects the evaporation rate of the droplet if the desired location of the reaction is in the air. This variable, humidity, can change the rate of evaporation if the humidity is high and cause a decrease in the evaporation rate or cause an increase in the evaporation rate if the humidity is low in the area where the described reaction is to take place.

Where the described reaction takes place in a liquid or gaseous environment the opacity of the liquid or gas can affect the reaction rate. The more opaque a liquid or gas is, a higher dose of photons and or phonons may be required to achieve the desired reaction rate due to the opacities of the medium and its ability to affect the photon/phonon emissions. Likewise, the viscosity of the medium where the described reaction takes place can influence the reaction rate. A higher viscosity medium can retard the reaction rate due to the loss of photon/phonon energy as the photons and or phonons move through the medium. A lower viscosity medium causes the photons and or phonons to lose less energy as they move through the medium.

In some instances, the described reaction may have an increased reaction rate with the addition of a catalyst. Iron oxides catalyze the conversion of hydrogen peroxide (H2O2) into oxidants capable of transforming recalcitrant contaminants. This is an example of an additive effect of a catalyst.

In some instances it may be desirable to slow down or halt the described reaction. Peroxidases or peroxide reductases are a group of enzymes which play a role in various chemical processes. They are named after the fact that they commonly break up peroxides.

Flocculants, also known as clarifying agents are used to remove suspended solids from liquids by inducing flocculation (the solids begin to aggregate forming flakes, which either precipitate to the bottom or float to the surface of the liquid, and then they can be removed or collected. Flocculants may be added to the described reaction before during or after the photon/phonon enhanced oxidizing agent is applied to the target where the described reaction is to take place. Flocculants may be added before the reaction to remove substances that are not desired to undergo the described reaction. In other instances, the flocculant may be added during the reaction or after the reaction depending on the desired outcome and use of the precipitated substance.

There are two types of atomic motion in a liquid: phonon motion and the diffusional motion due to an atom jumping between two equilibrium positions. In turn, the phonon and diffusional motion consists of kinetic and potential parts, giving the liquid energy as:

$$E=K_l+P_l+K_s(\omega>\omega_F)+P_s(\omega>\omega_F)+K_d+P_d \quad (1)$$

where Kl and Pl are kinetic and potential components of the longitudinal phonon energy, $K_s(\omega>\omega F)$ and $P_s(\omega>\omega F)$ are kinetic and potential components of the energy of shear phonons with frequency $\omega>\omega F$ and Kd and Pd are kinetic and potential energy of diffusing atoms. Diffusion is the net movement of anything (for example, atoms, ions, molecules, energy) from a region of higher concentration to a region of lower concentration. Diffusion is driven by a gradient in concentration. So, phonon motion (heat motion) and diffusion motion work together so that temperature and composition are the same throughout a liquid. In practice, most materials are filled with an ever-changing mix of phonons that have different frequencies and are traveling in different directions, all superimposed on each other, in the same way that the seemingly chaotic movements of a choppy sea can (theoretically) be untangled to reveal a variety of superimposed waveforms of different frequencies and directions. But unlike photons (the particles that carry light or other electromagnetic radiation), which generally don't interact at all if they have different wavelengths, phonons of different wavelengths can interact and mix when they bump into each other, producing a different wavelength. This makes their behavior much more chaotic and thus difficult to predict and control.

Photoexcitation is the production of an excited state of a quantum system by photon absorption. The excited state originates from the interaction between a photon and/or phonon and the quantum system. On the atomic and molecular scale photoexcitation is the photoelectrochemical process of electron excitation by photon absorption when the energy of the photon is too low to cause photoionization.

Multi-photon absorption (MPA) or multi-photon excitation or non-linear absorption is the simultaneous absorption of two or more photons of identical or different frequencies in order to excite a molecule from one state (usually the ground state) to a higher energy, most commonly an excited electronic state. Multi-photon absorption is one of a variety of multi-photon processes. In this specific process, two or more photons are absorbed by a sample simultaneously. Neither photon is at resonance with the available energy states of the system, however, the combined frequency of the photons is at resonance with an energy state. In quantum mechanics, an excited state of a system is any quantum state of the system that has a higher energy than the ground state (that is, more energy than the absolute minimum). Absorption of two or more photons with different frequencies is called non-degenerate multi-photon absorption. Since MPA depends on the simultaneous absorption of two or more photons, the probability of MPA is proportional to the square of the light intensity, thus it is a nonlinear optical process. The energy difference between the involved lower and upper states of the molecule is equal or smaller than the sum of the photon energies of the two or more photons absorbed. Multi-photon absorption is a third-order process, with absorption cross section typically several orders of magnitude smaller than one-photon absorption cross section. The constant value of the speed of light in vacuum goes against our intuition: we would expect that high energy (short wavelength) radiation would move faster than low energy (long wavelength) radiation. Light can be considered as a stream of minute packets of energy, photons and biophotons and generating phonons, which creates a pulsating electromagnetic disturbance. A single photon or biophoton differs from another photon or biophoton only by its energy. In empty space (vacuum), all photons and biophotons travel with the same speed or velocity. Photons and biophotons are slowed down generating phonons when they interact with different media such as water, glass or even air. This slowing down accounts for the refraction or bending of light. Refraction is the bending of a wave when it enters a medium where its speed is different. The refraction of light when it passes from a fast medium to a slow medium bends the light ray toward the normal to the boundary between the two media. The amount of bending depends on the indices of refraction of the two media and is described quantitatively by Snell's Law. As the speed of light is reduced in the slower medium, the wavelength is shortened proportionately. The energy of the photon and biophotons is not changed, but the wavelength is. This comes into play later in this technology description when wavelengths of dissociation are discussed. Different energy photons and biophotons are slowed by different amounts in glass or water or other substances; this leads to the dispersion of electromagnetic radiation and phonons. Greater intensity of light means only that more photons were available to hit a target per second and more electrons could be ejected from a target, not that there was more energy per photon or biophoton.

The energy of the outgoing electrons depends on the frequency of photons used. There are two kinds of interactions through which photons deposit their energy; both are with electrons. In one type of interaction the photon loses all its energy; in the other, it loses a portion of its energy, and the remaining energy is scattered generating phonons. The energy (E) of the incoming photons and biophotons is directly proportional to the frequency which can be written as E=hf in which h is a constant. Max Planck first proposed this relationship between energy and frequency in 1900 as part of his study of the way in which heated solids emit radiation. In one example, the photoelectric (photon-electron) interaction, a photon transfers all its energy to an electron located in one of the atomic shells. The electron is ejected from the atom by this energy and begins to pass through the surrounding matter. The electron rapidly loses its energy and moves only a relatively short distance from its original location. The photon's energy is, therefore, deposited in the matter close to the site of the photoelectric interaction. The energy transfer is a two-step process. The photoelectric interaction in which the photon transfers its energy to the electron is the first step. The depositing of the energy in the surrounding matter by the electron is the second step. Phonons and electrons are the two main types of elementary particles or excitations generated with photon reactions.

If the binding energy is more than the energy of the photon, a photoelectric interaction cannot occur. This interaction is possible only when the photon has sufficient energy to overcome the binding energy and remove the electron from the atom or a MPA reaction can occur depositing more energy. The photon's energy is divided into two parts by the interaction. A portion of the energy is used to overcome the electron's binding energy and to remove it from the atom. The remaining energy is transferred to the electron as kinetic energy (phonon) and is deposited near the interaction site. Since the interaction creates a vacancy in one of the electron shells, typically the K or L, an electron moves down to fill in. The drop in energy of the filling electron often produces a characteristic x-ray photon. The energy of the characteristic radiation depends on the binding energy of the electrons involved. Characteristic radiation initiated by an incoming photon is referred to as fluorescent radiation. Fluorescence, in general, is a process in which some of the energy of a photon is used to create a second photon of less energy. This process sometimes converts x-rays into light photons. Whether the fluorescent radiation is in the form of light or x-rays depends on the binding energy levels in the absorbing material.

In the embodiments, the linear attenuation coefficient ($\mu$) is the actual fraction of photons interacting per 1-unit thickness of material. Linear attenuation coefficient values indicate the rate at which photons interact as they move through material and are inversely related to the average distance photons travel before interacting. The rate at which photons interact (attenuation coefficient value) is determined by the energy of the individual photons or the MPAs and the atomic number and density of the material. This is important due to the activation of the enhanced antimicrobial oxidizing agent used in the embodiments. In some situations, it is more desirable to express the attenuation rate in terms of the mass of the material encountered by the photons and or phonons rather than in terms of distance. The quantity that affects attenuation rate is not the total mass of an object but rather the area mass. Area mass is the amount of material behind a 1-unit surface area, and can be shown as, the area mass is the product of material thickness and density: Area Mass (g/cm2)=Thickness (cm)×Density (g/cm3).

The mass attenuation coefficient, using this formula, is the rate of photon and or phonon interactions per 1-unit (g/cm2) area mass. By establishing a linear attenuation coefficient that does not diminish too rapidly with the functioning distance so that sufficient numbers of photons and or phonons are available for enhancement of the oxidizing agent an effective enhanced antimicrobial or enhanced catalyzed, or enhanced bleaching agent or enhanced other effects of reactive oxygen species and oxidizing agent can be generated for use in the embodiments' process in plasma, liquid, gas, solid or a combination of these states of matter. It is also displayed in this patent's agglomeration process.

Aggregation and agglomeration are two terms that are used to describe the assemblage of particles in a sample but clustering via agglomeration is irreversible. The main transport mechanisms by which particles can collide are Brownian motion, laminar or turbulent flow or relative particle settling and gravitational agglomeration. Gravitational agglomeration, which is dependent on the size of the particles and their terminal velocity, is one of the main focuses of this technology relating to the separation of particles in air, solutions or associated with a compound or material. Slowly settling particles interact with the more rapidly settling particles, leading to the formation of clusters. This process can be called agglomeration. Several different basic effects have been studied as being responsible for particle collision and agglomeration, which are mainly orthokinetic and hydrodynamic forces. In case of orthokinetic collisions the effective agglomeration rate constant or agglomeration input can be described as a product of the collision rate constant and an efficiency factor:

$$\beta=\psi(\varepsilon,\sigma)\beta \text{coll}$$

$\beta$coll increases linearly with the shear rate $\gamma$, that equals $\varepsilon/\nu$ in a turbulent stream, whereas the efficiency factor $\psi$ decreases strongly with $\gamma$ in this high shear region, and thus $\beta$ also decreases after having reached a maximal value at a rather low shear rate value. Although $\beta$ should be size-dependent, experimental agglomeration data can often be fitted with a size-independent input. It has been shown that $\beta$coll has a dependence on the mean particle size. The generated photon/phonon AOA MPA enhanced system also acts like a filter in that a blood cell, organic molecule, and/or microbial particle cannot pass through it without colliding with a photon and or phonon AOA particle. When a microbe, blood cell, and/or organic molecule collides with a photon and or phonon enhanced AOA particle, agglomeration occurs. As agglomerized particles bind together, their mass increases as a unit. Gravitational forces acting on the photon and or phonon agglomerized particles increase its velocity of fall. The photon and or phonon agglomerized particles continue to gather more particles as it falls through the selected medium such wastewater. An analogy would be a snowball rolling downhill continually increasing in size as it advances downhill. Since photon/phonon enhanced antimicrobial particles contain an augmented oxidizing agent, the microbe that contacts the photon and or phonon augmented oxidizing agent becomes agglomerized as it comes in contact with the AOA. These agglomerized particles can settle or be filtered to remove them from the solution, air, gas, liquid or plasma.

The foregoing description illustrate the principles, exemplary embodiments, and modes of operation of the invention. However, the invention should not be construed as being limited to the particular exemplary embodiments discussed above. Additional variations of the exemplary embodiments discussed above will be appreciated by those skilled in the art. Using no more than routine experimentation, one skilled in the art will recognize or be able to ascertain, many equivalents to the specific embodiments and methods described herein. Such equivalents are intended to be encompassed by the scope of the following claims.

Therefore, the above-described exemplary embodiments should be regarded as illustrative rather than restrictive. Accordingly, it should be appreciated that variations to those exemplary embodiments can be made by those skilled in the art without departing from the scope of the invention as defined by the following claims. For example, the relative quantities of the ingredients may be varied to optimize the desired effects, additional ingredients may be added, and/or similar ingredients may be substituted for one or more of the ingredients described. Additional advantageous features and functionalities associated with the methods, combinations and devices of the present disclosure will be apparent from the appended claims.

The invention claimed is:

1. A method for lysing and generating precipitate in a target material comprising animal fluids, blood, blood cells, nucleated blood cells, non-nucleated blood cells, cell components, microbes, bacteria, viruses, spores, fungi, and/or prions, to reduce or eliminate constituents selected from the group consisting of total dissolved solids (TDS), total suspended solids (TSS), BOD, minerals, proteins, microbes and combinations thereof so that the constituents can be separated from the target material, the method comprising creating an augmented oxidizing agent (AOA), by exposing at least one oxidizing agent to radiation with a wavelength from 0.01 nm to 845 nm the AOA contains electronically modified oxygen derivatives (EMODs) at a greater concentration then non-irradiated oxidizing agents, and subjecting the AOA to the target material.

2. The method of claim 1, further comprising separating constituents selected from the group consisting of total dissolved solids (TDS), total suspended solids (TSS), BOD, minerals, proteins, microbes and combinations thereof from the lysed target material and the generated precipitate.

3. The method of claim 2, wherein the separation is performed by a centrifuge, a decanter, or a filter.

4. The method of claim 2, wherein separated solid components are collected.

5. The method of claim 2, wherein separated liquid components are collected.

6. The method of claim 1, further comprising making the AOA by exposing the oxidizing agent to the radiation before the target material is subjected to the AOA.

7. The method of claim 1, further comprising applying the oxidizing agent to the target material, wherein the AOA is created by exposing the oxidizing agent to the radiation while the oxidizing agent is applied to the target material.

8. The method of claim 1, further comprising applying the oxidizing agent to the target material, wherein the AOA is created by exposing the oxidizing agent to the radiation after the oxidizing agent is applied to the target material.

9. The method of claim 1, wherein the AOA is created during at least one time selected from the group consisting of before subjecting the target material is subjected to the AOA, while the oxidizing agent is applied to the target material, and after the oxidizing agent is applied to the target material.

10. The method of claim 1, wherein the target material is heated or cooled before, during or after lysing and generation of precipitate by the AOA.

11. The method of claim 1, wherein the oxidizing agent is heated or cooled before after or during exposure to the radiation to create the AOA.

12. The method of claim 1, wherein the AOA created by exposing the oxidizing agent to the radiation exhibits a residual effect where the EMODs exist for a time that is longer than the nano-seconds typically attributed to EMODs.

13. The method of claim 1, wherein the target material subjected to the AOA exhibits a reduced microbial count due to effects of the EMODs in the AOA generated when the oxidizing agent and the radiation combined produce a total effect that is greater than the sum of the effects of the oxidizing agent and the radiation individually under conditions appropriate to lyse the target material and generate precipitate.

14. The method of claim 1, wherein the target material to be lysed is heated to inactivate substances such as enzymes before subjecting the target material to the AOA.

15. The method of claim 1, wherein the target material to be lysed is cooled to inactivate substances before subjecting the target material to the AOA.

16. The method of claim 1, wherein the target material to be lysed is alternatively heated and cooled to inactivate substances before subjecting the target material to the AOA.

17. The method of claim 1, wherein the target material to be lysed has its pH adjusted before, during, and/or after subjecting the target material to the AOA.

18. The method of claim 1, further comprising adding a clarifying agent and/or flocculent to target material before, during and/or after subjecting the target material to AOA.

* * * * *